United States Patent
Fujii et al.

(10) Patent No.: US 9,707,863 B2
(45) Date of Patent: Jul. 18, 2017

(54) OCCUPANT DETECTION METHOD AND OCCUPANT DETECTION APPARATUS

(71) Applicant: AISIN SEIKI KABUSHIKI KAISHA, Kariya-shi (JP)

(72) Inventors: Hiroyuki Fujii, Kariya (JP); Isao Honda, Chiryu (JP); Takahiro Izuno, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/341,334

(22) Filed: Nov. 2, 2016

(65) Prior Publication Data
US 2017/0129365 A1    May 11, 2017

(30) Foreign Application Priority Data
Nov. 5, 2015 (JP) .................. 2015-217616

(51) Int. Cl.
*B60N 2/00* (2006.01)
(52) U.S. Cl.
CPC ..................... *B60N 2/002* (2013.01)
(58) Field of Classification Search
CPC ........ B60N 2/002; B60N 2/0244; B60N 2/04; B60N 2/22
See application file for complete search history.

(56) References Cited

U.S. PATENT DOCUMENTS

2016/0221475 A1* 8/2016 Sugiyama ............... B60N 2/72

FOREIGN PATENT DOCUMENTS

| JP | 2008-143481 | 6/2008 |
|----|-------------|--------|
| JP | 2012-101566 | 5/2012 |
| JP | 2015-116890 | 6/2015 |

* cited by examiner

*Primary Examiner* — Richard Camby
(74) *Attorney, Agent, or Firm* — Oblon, McClelland, Maier & Neustadt, L.L.P.

(57) ABSTRACT

An occupant detection method includes detecting a load applied to a seat for a vehicle, determining whether or not an occupant is seated at the seat, calculating a load deviation value indicating deviation of the load, determining whether or not the deviation exists at the seat on the basis of the load deviation value, and estimating that a seating posture of the occupant is inclined in a direction in which the load is deviated in a case where it is determined that the deviation exists and that a stable state is established, the stable state corresponding to a state in which a difference between a first change amount in a first cycle and a second change amount in a second cycle is within a predetermined range.

13 Claims, 11 Drawing Sheets

Posture inclined towards outer side

Seating position at outer side

OCCUPANT DETECTION METHOD AND OCCUPANT DETECTION APPARATUS

CROSS REFERENCE TO RELATED APPLICATIONS

This application is based on and claims priority under 35 U.S.C. §119 to Japanese Patent Application 2015-217616, filed on Nov. 5, 2015, the entire content of which is incorporated herein by reference.

TECHNICAL FIELD

This disclosure generally relates to an occupant detection method and an occupant detection apparatus.

BACKGROUND DISCUSSION

A known method for detecting a seating state of an occupant at a seat for a vehicle includes monitoring a deviation of a load generated at the seat, that is, a deviation of a seat load. For example, at a side airbag control apparatus described in JP2008-143481A1 (which will be hereinafter referred to as Patent reference 1), a load sensor is provided at each of four leg portions supporting a seat of a vehicle. In Patent reference 1, an entire seat load is detected by adding together sensor load detection values of the four sensors. Further, with the use of the two load sensors positioned at a vehicle-width direction outer side, the load detection value at the vehicle-width direction outer side is obtained. A width-direction load ratio of the seat is calculated by dividing the load detection value at the vehicle-width direction outer side by the entire seat load.

In this case, the larger the width-direction load ratio is, it is determined that the more the seat load is deviated towards the vehicle-width direction outer side. Further, in Patent reference 1, in a case where the width-direction load ratio exceeds a predetermined threshold value, it is determined that an occupant at the seat is seated while being deviated significantly towards the vehicle width-direction outer side. In such a case, a side airbag is prohibited from being inflated, thereby allowing the side airbag to function more effectively.

However, in such an airbag inflation control described above, contents of the control have always been improved. In addition, recently, a seating posture and/or a seating position of the occupant at the seat are considered not only in the airbag inflation control but also in various fields of control. Thus, because a more detailed seating state of the occupant is required to be obtained with regard to occupant detection, there remains room for improvement in this aspect.

A need thus exists for an occupant detection method and an occupant detection apparatus, which are not susceptible to the drawback mentioned above.

SUMMARY

According to an aspect of this disclosure, an occupant detection method includes detecting a load applied to a seat for a vehicle, determining whether or not an occupant is seated at the seat, calculating a load deviation value indicating deviation of the load at the seat, determining whether or not the deviation exists at the seat on the basis of the load deviation value, and estimating that a seating posture of the occupant at the seat is inclined in a direction in which the load is deviated in a case where it is determined that the deviation exists and that a stable state is established, the stable state corresponding to a state in which a difference between a first change amount indicating a change amount of the load deviation value in a first cycle and a second change amount indicating a change amount of the load deviation value in a second cycle is within a predetermined range.

According to another aspect of this disclosure, an occupant detection apparatus includes a load detection portion detecting a load applied to a seat for a vehicle a seating determination portion determining whether or not an occupant is seated at the seat, a first calculation portion calculating a load deviation value indicating deviation of the load at the seat, a deviation determination portion determining whether or not the deviation exists at the seat on the basis of the load deviation value, and a first estimation portion estimating that a seating posture of the occupant at the seat is inclined in a direction in which the load is deviated in a case where it is determined that the deviation exists and that a stable state is established, a difference between a first change amount indicating a change amount of the load deviation value in a first cycle and a second change amount indicating a change amount of the load deviation value in a second cycle being within a predetermined range in the stable state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A first embodiment of an occupant detection apparatus implemented on a seat for a vehicle will be explained hereunder with reference to the drawings.

Figure 1:
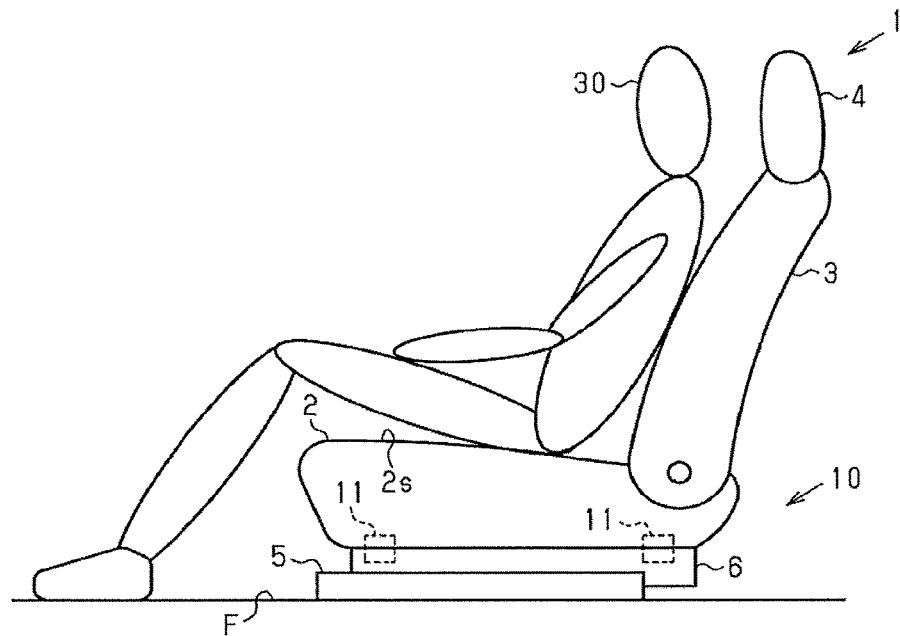
FIG. 1 is a side view of a seat for a vehicle according to embodiments disclosed here.

As illustrated in FIG. 1, a seat 1 for a vehicle includes a seat cushion 2, and a seatback 3 provided at a rear end portion of the seat cushion 2 to be tiltable relative to the rear end portion of the seat cushion 2. A headrest 4 is provided at an upper end of the seatback 3.

In the embodiment, a pair of lower rails 5, 5 arranged at right and left, respectively, is provided at a floor portion F of the vehicle so as to extend in a vehicle front and rear direction. An upper rail 6 is attached to each lower rail 5 to be movable on the lower rail 5 relative to the lower rail 5 in an extending direction thereof. The seat 1 of the embodiment is configured to be supported above a seat slide apparatus 10 formed by each of the lower rails 5 and the upper rails 6.

Figure 2:
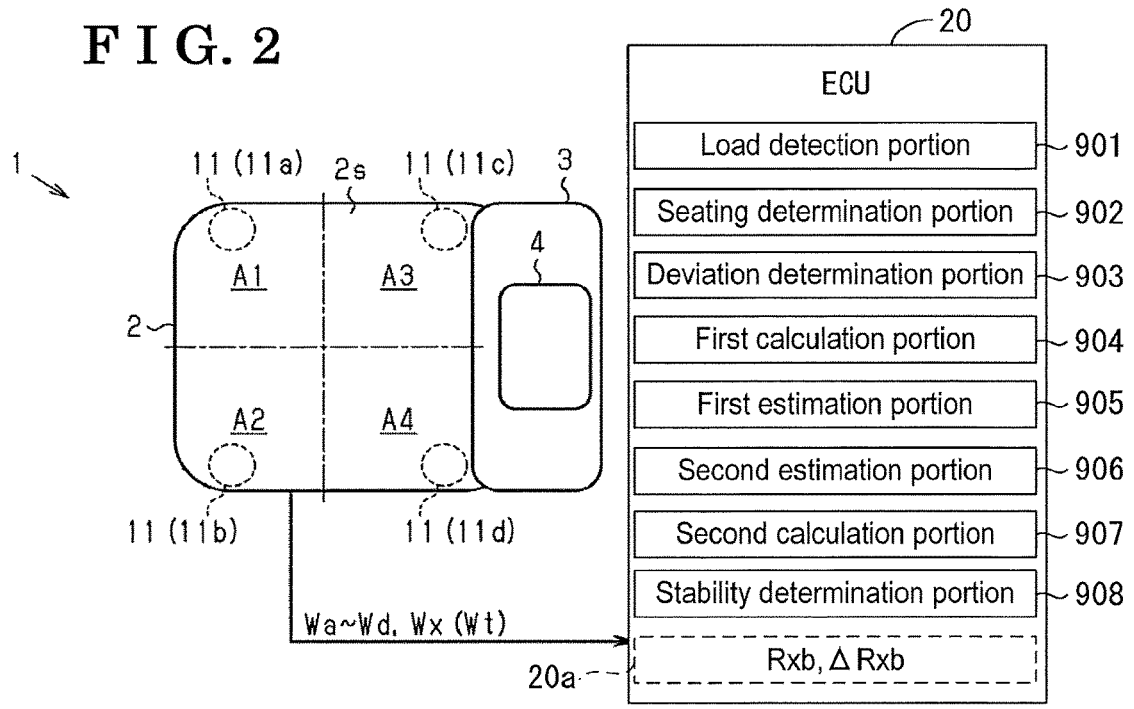
FIG. 2 is a schematic view illustrating load sensors provided below the seat, and an ECU serving as an occupant detection apparatus according to the embodiments.

As illustrated in FIGS. 1 and 2, in the embodiment, plural load sensors 11 are provided below the seat 1. Specifically, the load sensors 11 (that is, the load sensors 11a, 11b, 11c, 11d) are interposed between the upper rails 6 and the seat 1, more specifically, between the upper rails 6 and a frame of the seat cushion 2 of the seat 1. The upper rails 6 serve as a support member forming the seat slide apparatus 10 and the seat 1 is supported above the upper rails 6, as described above. A known strain gauge is used for the load sensor 11. The load sensors 11 are arranged at positions corresponding to the four corner portions of the seat cushion 2 including a seating surface 2s formed in a substantially rectangular.

As illustrated in FIG. 2, when a load is applied to the seat 1, an output signal of each of the load sensors 11 is inputted to an ECU 20 serving as an occupant detection apparatus. At a load detection portion 901 (FIG. 2), the ECU 20 of the embodiment is configured to detect the load applied to the seat 1 (a sensor load detection value Wa, Wb, Wc, Wd) for each of four regions in which the respective load sensors 11a to 11d are provided, on the basis of the output signal of each of the load sensors 11a to 11d. The four regions correspond to regions A1, A2, A3, A4 that are obtained or defined by dividing the seating surface 2s of the seat cushion 2 into four, that is, into front, rear, right and left portions.

That is, the sensor load detection value Wa from the first load sensor 11a indicates the load at a front outer side (an outer side, that is, the region A1 of FIG. 2) of the seat 1. The sensor load detection value Wb from the second load sensor 11b indicates the load at a front inner side (an inner side, that is, the region A2 of FIG. 2) of the seat 1. The sensor load detection value Wc from the third load sensor 11c indicates the load at a rear outer side (the region A3 of FIG. 2) of the seat 1. The sensor load detection value Wd from the fourth load sensor 11d indicates the load at a rear inner side (the region A4 of FIG. 2) of the seat 1.

The ECU 20 of the embodiment calculates a total value Wt of the sensor load detection values Wa, Wb, Wc, Wd. At the ECU 20, the total value Wt of the sensor load detection values Wa, Wb, Wc, Wd corresponds to a detection value Wx of the load applied to the seat 1, that is, the detection value of the load at a whole of the seat 1 (that is, Wx=Wt=Wa+Wb+Wc+Wd). At a seating determination portion 902 (FIG. 2), the ECU 20 of the embodiment is configured to detect that an occupant 30 is seated at the seat 1 on the basis of the sensor load detection values Wa to Wd, and the detection value Wx of the load which corresponds to the total value Wt of the sensor load detection values Wa to Wd.

Figure 3:
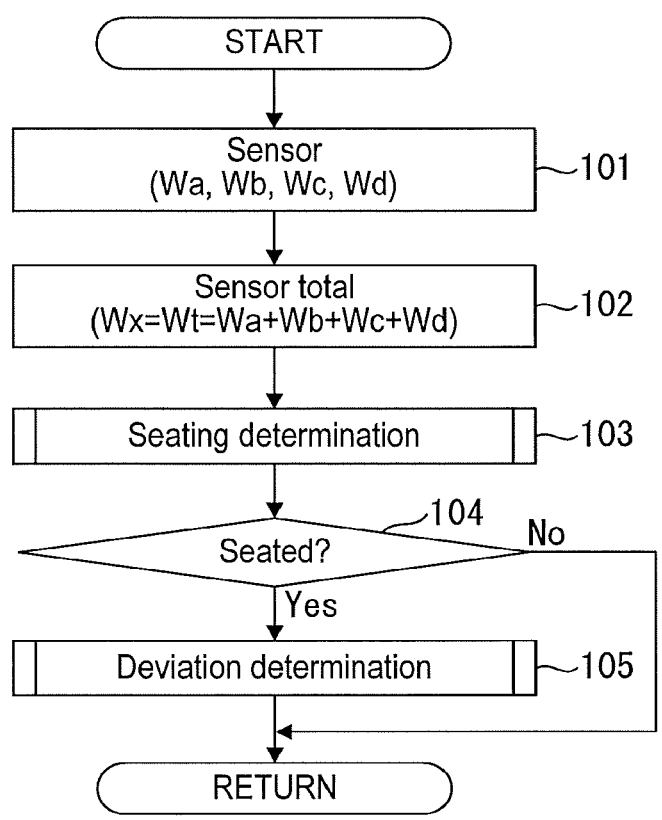
FIG. 3 is a flowchart showing procedures of an occupant detection according to the embodiments.

In detail, as shown in the flowchart of FIG. 3, the ECU 20 of the embodiment obtains the sensor load detection values Wa to Wd (Step S101), and thereafter the ECU 20 calculates the total value Wt of the sensor load detection values Wa to Wd and allows the total value Wt to be the detection value Wx of the load applied to the entire seat 1 (Step S102). Then, on the basis of the detection value Wx of the load, the ECU 20 determines whether or not the occupant 30 is in a state of being seated at the seat 1 (a seating determination, Step S103).

Figure 4:
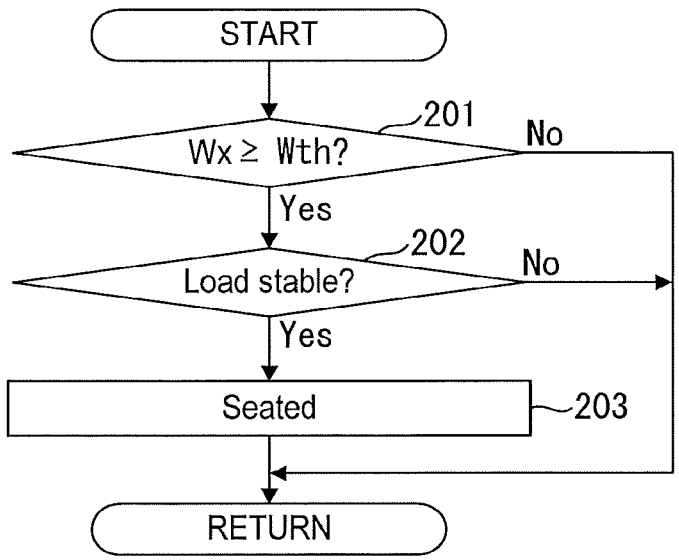
FIG. 4 is a flowchart showing procedures of a seating determination according to the embodiments.

Specifically, as shown in the flowchart of FIG. 4, in the seating determination (refer to FIG. 3, Step S103), the ECU 20 of the embodiment determines whether or not the detection value Wx of the load is equal to or greater than a predetermined threshold value Wth (Step S201). In addition, the ECU 20 determines whether or not the detection value Wx of the load is stable (Step S202). In a determination on a stable state of the load, the ECU 20 of the embodiment determines that the detection value Wx of the load is stable in a case where the detection value Wx of the load stays within a predetermined variation range or predetermined fluctuation range, for a predetermined time period. Then, the ECU 20 determines that the occupant 30 is seated at the seat 1 (Seated, Step S203) in a case where the detection value Wx of the load is equal to or greater than the threshold value Wth (Wx≥Wth, Step S201: YES) and the detection value Wx of the load is stable (Step S202: YES).

As shown in the flowchart of FIG. 3, in the seating determination of Step S103, in a case where the ECU 20 of the embodiment determines that the occupant 30 is in a state of being seated at the seat 1 (Step S104: YES), the ECU 20 determines whether or not the occupant 30 is in a deviated seating posture deviated in any direction and/or the occupant 30 is at a deviated seating position deviated in any direction (a deviation determination, Step S105). Then, at the vehicle of the embodiment, an inflation control mode of an airbag mounted on the vehicle is configured to be chosen, and an alarm output using, for example, warning lamp and/or a loudspeaker is performed, on the basis of a result of the deviation determination, that is, on the basis of whether or not the seating posture and/or the seating position of the occupant at the seat 1 is appropriate.

In detail, at a deviation determination portion 903 (FIG. 2), the ECU 20 of the embodiment determines whether or not a deviation of the load is generated at the seat 1 at which the occupant 30 is seated. On the basis of the determination, the ECU 20 determines that the occupant 30 is in a state of being seated at the seat 1 while being deviated in a direction in which the deviation of the load is generated.

Figure 5:
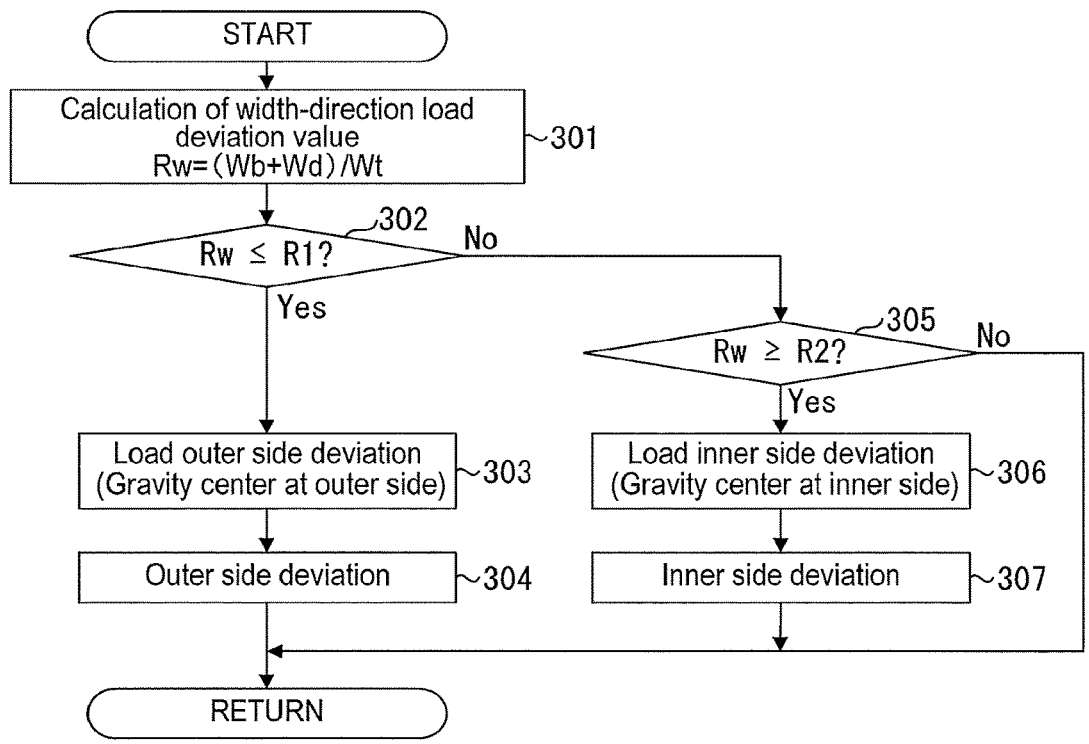
FIG. 5 is a flowchart showing procedures of a deviation determination (a width-direction deviation) according to the embodiments.

Specifically, as shown in the flowchart of FIG. 5, the ECU 20 divides a total value of the sensor load detection values Wb and Wd by the total value Wt of the sensor load detection values Wa to Wd, and thereby calculating a width-direction load ratio Rw (the width-direction load ratio Rw indicates a width-direction load deviation value) of the seat 1 (Rw=(Wb+Wd)/Wt, Step S301). The sensor load detection values Wb and Wd indicate an inner side load of the seat 1 (refer to FIG. 2, the loads in the regions A2 and A4). Further, the ECU 20 determines whether or not the width-direction load ratio Rw is equal to or smaller than a predetermined threshold value R1 (Step S302). In a case where the ECU 20 determines that the width-direction load ratio Rw is equal to or smaller than the threshold value R1 (Rw≥R1, Step S302: YES), the ECU 20 determines that the load is in the state of being deviated towards a vehicle width direction outer side (a gravity center at an outer side, Step S303). Accordingly, the ECU 20 detects that the occupant 30 at the seat 1 is deviated towards the vehicle width direction outer side (an outer side deviation, Step S304).

On the other hand, in a case where the ECU 20 determines that the width-direction load ratio Rw is greater than the predetermined threshold value R1 (Rw>R1, Step S302: NO) in Step S302, the ECU 20 then determines whether or not the width-direction load ratio Rw is equal to or greater than a predetermined threshold value R2 (Step S305). In a case where the ECU 20 determines that the width-direction load ratio Rw is equal to or greater than the threshold value R2 (Rw≥R2, Step S305: YES), the ECU 20 determines that the load is in a state of being deviated towards a vehicle width direction inner side (a gravity center at an inner side, Step S306). Accordingly, the ECU 20 detects that the occupant 30 at the seat 1 is deviated towards the vehicle width direction inner side (an inner side deviation, Step S307).

Figure 6:
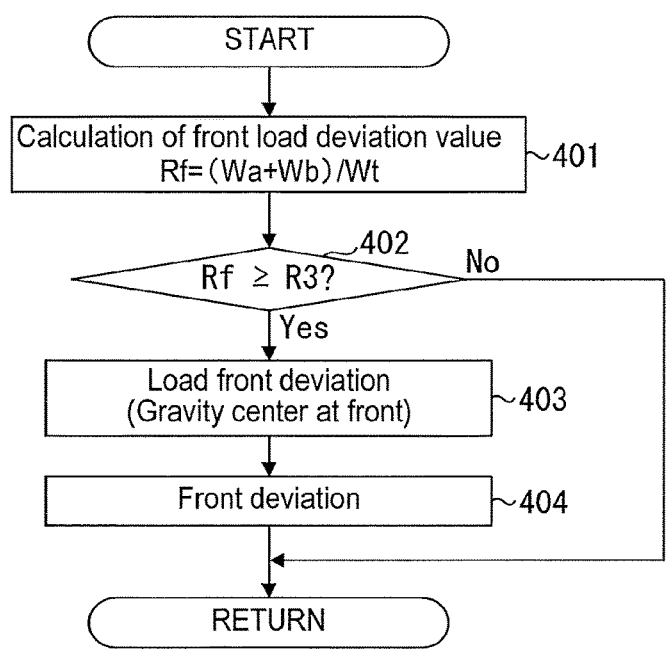
FIG. 6 is a flowchart showing procedures of the deviation determination (a front deviation) according to the embodiments.

In addition, as shown in the flowchart of FIG. 6, the ECU 20 divides a total value of the sensor load detection values Wa and Wb by the total value Wt of the sensor load detection values Wa to Wd, and thereby calculating a front load ratio Rf (the front load ratio Rf indicates a front direction load deviation value) of the seat 1 (Rf=(Wa+Wb)/Wt, Step S401). The sensor load detection values Wa and Wb represent a front load of the seat 1 (refer to FIG. 2, the loads in the regions A1 and A2). Further, the ECU 20 determines whether or not the front load ratio Rf is equal to or greater than a predetermined threshold value R3 (Step S402). In a case where the ECU 20 determines that the front load ratio Rf is equal to or greater than the threshold value R3 (Rf≥R3, Step S402: YES), the ECU 20 determines that the load is in the state of being deviated towards the front side (a gravity center at the front side, Step S403). Accordingly, the ECU 20 detects that the occupant 30 at the seat 1 is deviated towards the front side (Step 404).

At a first calculation portion 904 (FIG. 2), the ECU 20 calculates the width-direction load ratio Rw and the front load ratio Rf each serving as a load ratio Rx of the seat 1, the load ratio Rx indicates the deviation of the load (the load ratio Rx indicates a load deviation value), and thereby performing the deviation determination. In addition, the ECU 20 of the embodiment monitors a transition of the load ratio Rx, the transition which leads to a deviation detection, that is, the transition which takes place on the way to the deviation detection. Thus, it is configured such that the ECU 20 estimates a type of the deviation.

Figure 7A:
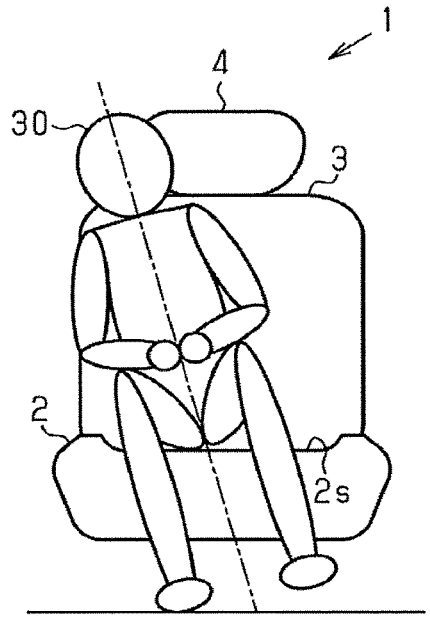
FIG. 7A is an explanation view showing a seating posture of an occupant in a case where the seating posture is inclined towards a vehicle-width direction outer side (an inclined posture) according to the embodiments.
Figure 7B:
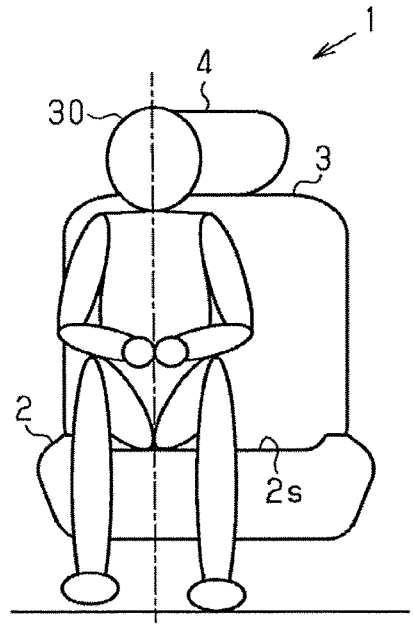
FIG. 7B is an explanation view showing a seating position of the occupant in a case where the seating position is shifted or displaced towards the vehicle-width direction outer side (being seated at an outward portion of the seat) according to the embodiments.

That is, as shown in FIGS. 7A and 7B, for example, in a case where a posture of the occupant 30 seated at the seat 1 is inclined towards the vehicle width direction outer side (refer to FIG. 7A, a posture inclined towards the outer side, leaning against a door), a gravity center of the occupant 30 is positioned at the vehicle width direction outer side of the seat 1, and thus the outer side deviation of the load is detected in the deviation determination of the load (refer to FIG. 5, Step S303). Also in a case where a seating position of the occupant 30 relative to the seat 1 is displaced towards the vehicle width direction outer side (refer to FIG. 7B, being seated at the outer side portion of the seat), the gravity center is positioned at the vehicle width direction outer side of the seat 1, and thus the outer side deviation of the load is detected.

However, even though the outer side deviation of the load is detected in the above described cases in a similar manner to each other, there is a difference in an action of the occupant 30 between "the posture inclined towards the outer side" and "being seated at the outer side portion of the seat". The ECU 20 of the embodiment monitors an influence given by the action of the occupant 30 on the transition of the load ratio Rx. Accordingly it is configured such that the ECU 20 estimates whether the type of the deviation corresponds to "inclination of the seating posture" in the deviation direction of the load or corresponds to "displacement of the seating position" in the deviation direction of the load.

Figure 8:
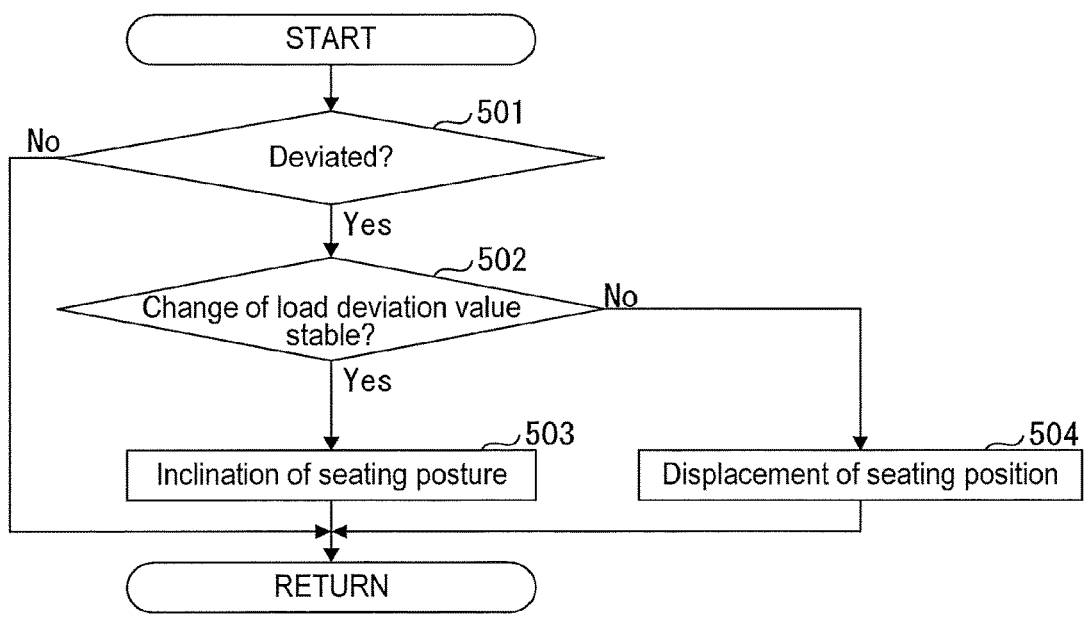
FIG. 8 is a flowchart showing procedure of determination of a type of a deviated seating state according a first embodiment disclosed here.

In detail, as shown in the flowchart of FIG. 8, in a case where the deviation is detected (Step S501: YES), the ECU 20 of the embodiment determines whether or not a change of the load ratio Rx, the change which leads to the deviation detection, was a stable change transitioning at a substantially steady or constant inclination (Step S502). Then, in a case where it is determined at a first estimation portion 905 (refer to FIG. 2) that the change of the load ratio Rx which leads to the deviation detection was the stable change (Step S502: YES), the ECU 20 estimates that the posture of the occupant 30 seated at the seat 1 is inclined towards the deviation direction of the load (the inclination of the seating posture, Step S503).

In a case where it is determined at a second estimation portion 906 (refer to FIG. 2) that the change of the load ratio Rx which leads to the deviation detection was an unstable change (Step S502: NO), the ECU 20 estimates that the seating position of the occupant 30 relative to the seat 1 is displaced in the deviation direction of the load (the displacement of the seating position, Step S504).

Figure 9:
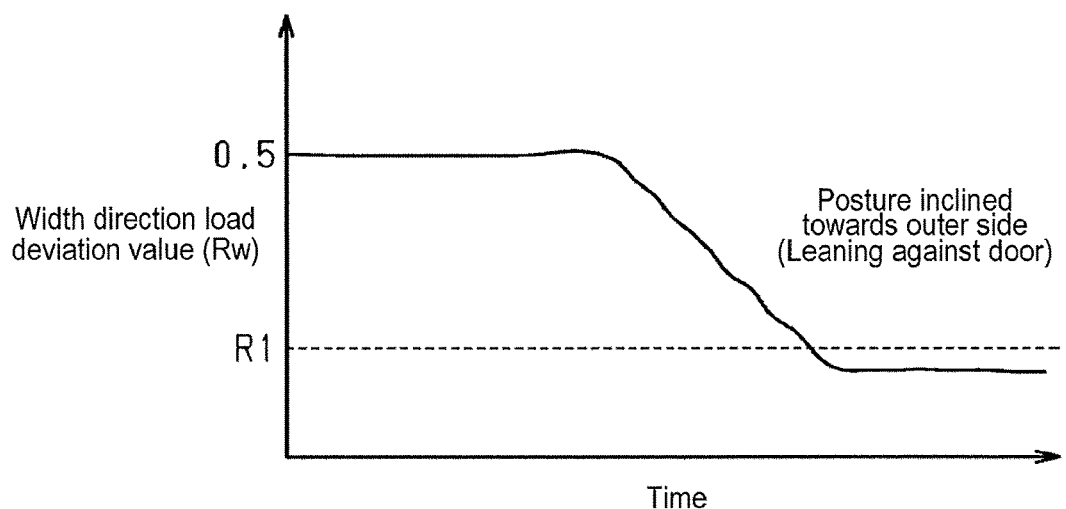
FIG. 9 is an explanation view showing a transition of a load deviation value which leads to a deviation detection (when a posture is inclined) according to the embodiments.
Figure 10:
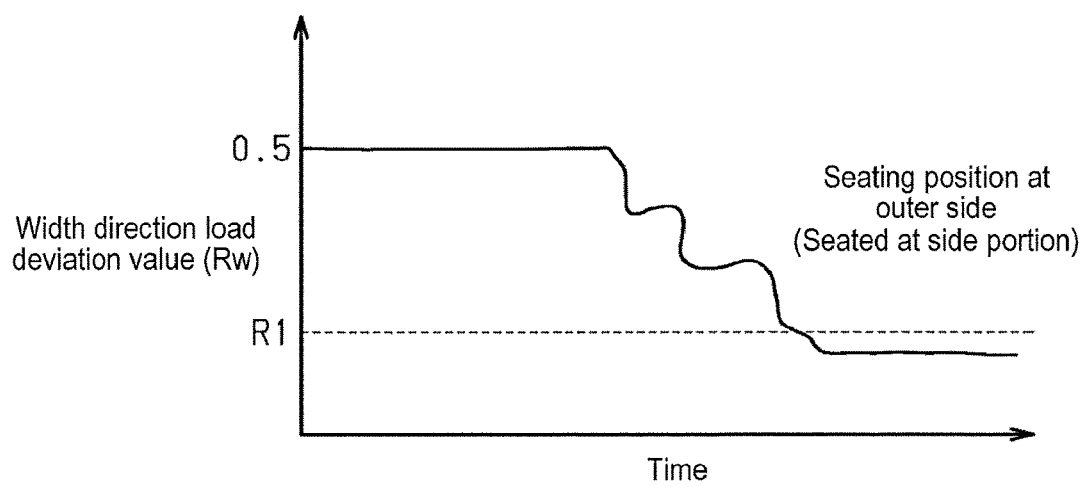
FIG. 10 is an explanation view showing a transition of the load deviation value which leads to the deviation detection (when a position is changed) according to the embodiments.

For example, as shown in FIGS. 9 and 10, in a case where the ECU 20 detects the outer side deviation, the ECU 20 determines whether the change of the width-direction load ratio Rw which leads to the deviation detection was the stable change transitioning at the substantially constant inclination (refer to FIG. 9) or the unstable change transitioning while repeating increase and decrease (refer to FIG. 10). In a case where the change of the width-direction load ratio Rw was stable, the ECU 20 estimates that the posture of the occupant 30 seated at the seat 1 is inclined or tilted towards the vehicle width direction outer side as shown in FIG. 7A. In a case where the change of the width-direction load ratio Rw is unstable, the ECU 20 estimates that the seating position of the occupant 30 of the seat 1 is displaced or shifted towards the vehicle width direction outer side as shown in FIG. 7B.

That is, in many cases, the occupant 30 seated at the seat 1 changes the seating position while remaining seated at the seat 1 in a manner that the occupant 30 alternately lifts his or her right and left buttocks and thighs which are placed on the seating surface 2s of the seat 1, thereby generating changes or fluctuations of the load. These changes appear as the unstable change of the load ratio Rx, which leads to the deviation detection.

In a case where the occupant 30 seated at the seat 1 inclines his or her posture, however, the occupant 30 does not necessarily need to perform such an action of lifting the buttocks and thighs from the seating surface 2s. In this case, the change of the load ratio Rx on the way to the deviation detection corresponds to the stable change including a small fluctuation width or small fluctuation range of the inclination. The ECU 20 of the embodiment, by utilizing the above-described characteristics, is capable of estimating "the inclination of the seating posture" and "the displacement of the seating position" distinctively from each other.

In more detail, when the deviation is detected, in a case where it is determined that a stable state continued, the ECU 20 of the embodiment determines that the change of the load ratio Rx was stable. The stable state corresponds to a state in which the fluctuation range of the inclination of the change of the load ratio Rx which leads to the deviation detection is within a predetermined range. In a case where the stable state, in which the fluctuation range of the inclination of the change of the load ratio Rx which leads to the deviation detection is within the predetermined range, did not continue, the ECU 20 determines that the change of the load ratio Rx was unstable.

Specifically, at a second calculation portion 907 (FIG. 2), the ECU 20 of the embodiment calculates the load ratio Rx in a predetermined calculation cycle and holds or stores a previous value Rxb of the load ratio Rx in a memory area 20a of the ECU 20 (refer to FIG. 2). The previous value Rxb is the load ratio Rx that is calculated in the previous calculation cycle. In addition, in a first cycle corresponding to a current calculation cycle, the ECU 20 calculates a first change amount $\Delta Rx$ between a current value of the load ratio Rx and the previous value Rxb of the load ratio Rx ($\Delta Rx=|Rx-Rxb|$). Also with regard to the first change amount $\Delta Rx$, the ECU 20 stores in the memory area 20a a second change amount $\Delta Rxb$ calculated in a second cycle corresponding to the previous calculation cycle. The ECU 20 of the embodiment determines whether or not a difference between the first change amount $\Delta Rx$, that is, the current value, of the change ratio Rx and the second change amount $\Delta Rxb$, that is, the previous value, of the change ratio Rx is smaller than a predetermined threshold value $\delta$ ($|\Delta Rx-\Delta Rxb|<\delta$).

That is, the inclination of the change of the load ratio Rx is indicated by the first change amount $\Delta Rx$ of each calculation cycle. The fluctuation range of the inclination of one calculation cycle is indicated by the difference between the first change amount $\Delta Rx$ and the second change amount $\Delta Rxb$ ($|\Delta Rx-\Delta Rxb|$). Thus, the ECU 20 of the embodiment is configured to determine whether or not the fluctuation range of the inclination of the change of the load ratio Rx is in the stable state of being within a predetermined range defined by the predetermined threshold value $\delta$ ($\Delta Rx<\Delta Rxb\pm\delta$), and whether or not the stable state is continuing.

Figure 11:
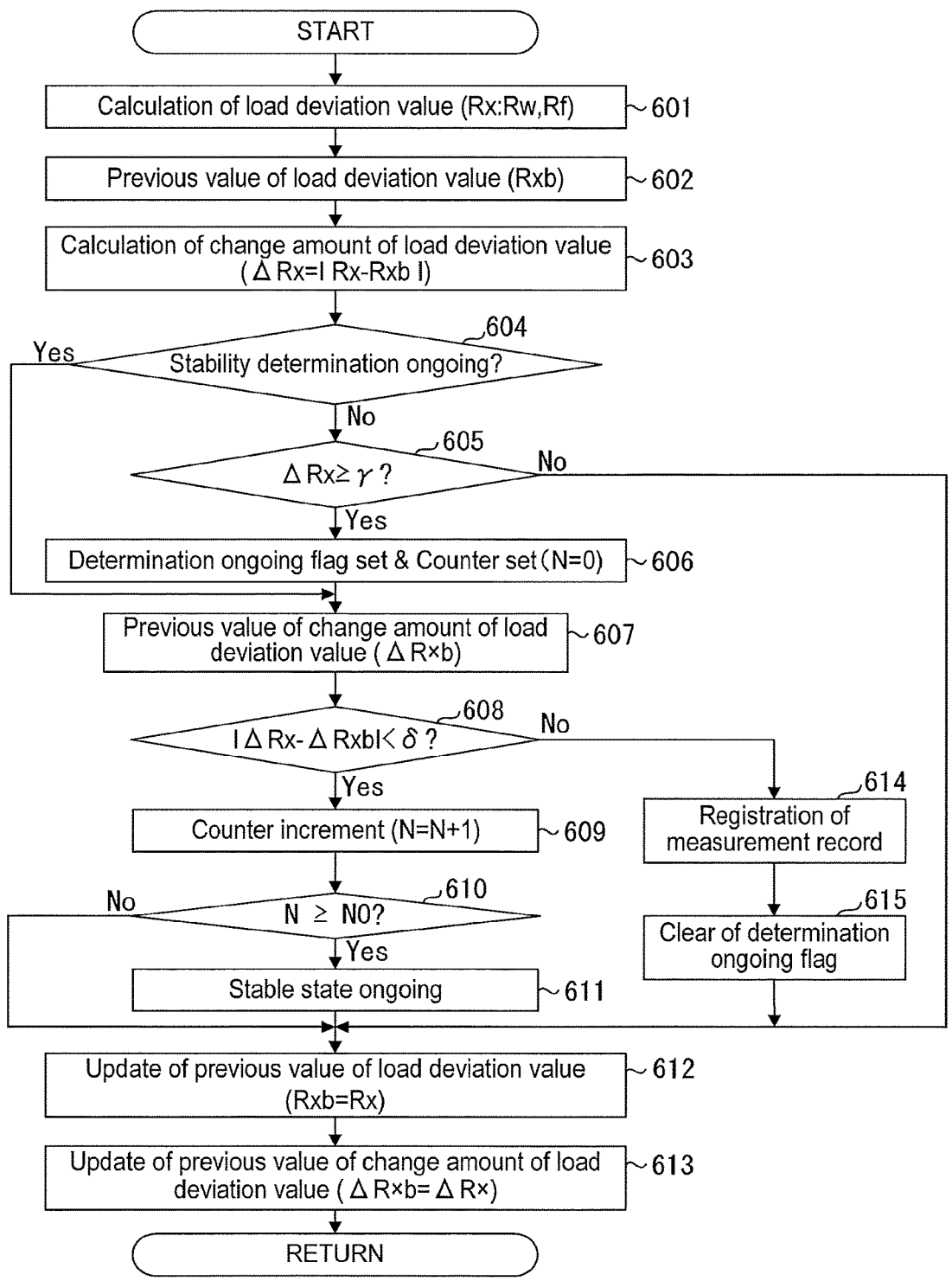
FIG. 11 is a flowchart showing procedure of a stability determination related to a changing state of the load ratio according to the embodiment.

Next, procedures of a stability determination related to a changing state of the load ratio Rx, the procedures which are performed by the ECU 20 of the embodiment, will be described. As shown in the flowchart of FIG. 11, the ECU 20 of the embodiment calculates the load ratio Rx (Step S601), the ECU 20 first reads the previous value Rxb of the load ratio Rx (Step S602), and thus the ECU 20 calculates the first change amount $\Delta Rx$ of the load ratio Rx of the calculation cycle ($\Delta Rx=|Rx-Rxb|$, Step S603). Next, at a stability determination portion 908 (FIG. 2), the ECU 20 determines whether or not the stability determination related to the changing state of the load ratio Rx is ongoing (Step S604). In a case where the ECU 20 determines that the stability determination is not ongoing (Step S604: NO), the ECU 20 determines whether or not the first change amount $\Delta Rx$ of the load ratio Rx which is calculated at Step S603 is equal to or greater than a predetermined threshold value $\gamma$ (Step S605). In a case where the first change amount $\Delta Rx$ of the load ratio Rx is equal to or greater than the threshold value $\gamma$ ($\Delta Rx\geq\gamma$, Step S605: YES), the ECU 20 sets a determination flag, that is, a determination ongoing flag which indicates that the stability determination is ongoing, and sets a counter (N=0, Step S606).

Next, the ECU 20 reads the second change amount $\Delta Rxb$ calculated in the previous calculation cycle, the second change amount $\Delta Rxb$ which is the previous amount of the first change amount $\Delta Rx$ of the load ratio Rx (Step S607). The ECU 20 determines whether or not the difference between the first change amount $\Delta Rx$ and the second change amount $\Delta Rxb$ is smaller than the predetermined threshold value $\delta$ (Step S608). In a case where the difference between the first change amount $\Delta Rx$ and the second change amount $\Delta Rxb$ is smaller than the threshold value $\delta$ ($|\Delta Rx-\Delta Rxb|<\delta$, Step S608: YES), the ECU 20 increments the counter that is set in Step S606 (N=N+1, Step S609) and then, the ECU 20 determines whether or not a counter value N of the counter is equal to or greater than a predetermined threshold value N0 (Step S610). In a case where the counter value N is equal to or greater than the predetermined threshold value N0 (N≤N0, Step S610: YES), in regard to the change of the load ratio Rx, the ECU 20 of the embodiment determines that the stable state, in which the state where the fluctuation range of the inclination is within the predetermined range continues, is established (Step S611).

Next, in regard to the change of the load ratio Rx, the ECU 20 updates the previous value Rxb with the current value calculated at Step S601 (Rxb=Rx, Step S612). Similarly, with regard also to the first change amount $\Delta Rx$ of the load ratio Rx, the second change amount $\Delta Rxb$ is updated with the current value calculated at Step S603 ($\Delta Rxb=\Delta Rx$, Step S613).

In a case where the ECU 20 of the embodiment determines that the counter value N is less than the predetermined threshold value N0 at Step 610 (N<N0, Step S610: NO), the ECU 20 does not perform the above-described procedure of Step S611 and performs the procedure of each of Step S612 and Step S613. At Step S608, in a case where the difference between the first change amount $\Delta Rx$ and the second change amount $\Delta Rxb$ is equal to or greater than the predetermined threshold value $\delta$ with regard to the first change amount $\Delta Rx$ of the load ratio Rx ($|\Delta Rx-\Delta Rxb|\geq\delta$, Step S608: NO), the ECU 20 of the embodiment does not perform the procedures of Step S609 to Step S611.

The counter value N of the embodiment indicates the number of consecutive times that the determination is made, the determination in which the difference between the first change amount $\Delta Rx$ and the second change amount $\Delta Rxb$ is smaller than the predetermined threshold value δ (|ΔRx−ΔRxb|<δ) with regard to the change of the load ratio Rx calculated in the cyclic manner. That is, the counter value N indicates the number of consecutive times at which it is determined that "with regard to the change of the load ratio Rx, the fluctuation range of the inclination is in the state of being within the predetermined range". Then the ECU 20 registers in the memory area 20a a measurement record (for example, the counter value N and a measurement time) of the stability determination (Step S614). The ECU 20 clears the determination ongoing flag (Step S615), and performs the procedures of the Step S612 and Step S613.

Further, in a case where the ECU 20 of the embodiment determines at Step S604 that the stability determination related to the changing state of the load ratio Rx is already being performed, that is, ongoing (Step S604: YES), the ECU 20 does not perform the procedure of each of Step S605 and Step S606. In a case where the ECU 20 determines at Step S605 that the first change amount ΔRx of the load ratio Rx is smaller than the predetermined threshold value γ (Step S605: NO), the ECU 20 does not perform the procedures of Step S606 to Step S611, Step S614 and Step S615, and the ECU 20 performs the procedures of Step S612 and Step S613.

That is, in a case where the deviation is detected (refer to FIG. 8, Step S501: YES), the ECU 20 of the embodiment determines at Step S611 whether or not the stability of the change of the load ratio Rx is shown or indicated. That is, with regard to the change of the load ratio Rx that is periodically calculated, the ECU 20 of the embodiment determines whether or not the counter value N is equal to or greater than the predetermined threshold value N0. Here, the counter value N indicates the number of consecutive times at which the difference between the first change amount ΔRx and the second change amount ΔRxb is smaller than the predetermined threshold value δ (|ΔRx−ΔRxb|<δ, Step S608: YES). In a case where the stability in the change is shown or indicated (N≥N0, Step S610: YES, and Step S611), the ECU 20 determines "the stable state, in which the difference between the first change amount ΔRx and the second change amount ΔRxb is within the predetermined range, is established", and the ECU 20 determines the type of the deviation as "the inclination of the seating posture" (refer to FIG. 8, Step S503). "The stable state in which the difference between the first change amount ΔRx and the second change amount ΔRxb is within the predetermined range is established" corresponds to "the state in which the fluctuation range of the inclination of the change of the load ratio Rx which leads to the deviation determination is within the predetermined range was continuing".

In a case where the stability of the change is not indicated or shown at Step S611 (Step S605: NO, or Step S608: NO or Step S610: NO), the ECU 20 of the embodiment determines that "the stable state in which the difference between the first change amount ΔRx and the second change amount ΔRxb is in the predetermined range is not established". Then, the ECU 20 determines the type of the deviated state as "the displacement of the seating position" (refer to FIG. 8, Step S504).

According to the embodiment, the following effects can be obtained. (1) The ECU 20 calculates the load ratio Rx indicating the deviation of the load on the basis of each of the sensor load detection values Wa to Wd obtained by the load sensors 11 provided at the positions corresponding to the four corner portions of the seat cushion 2, and on the basis of the total value Wt of the sensor load detection values Wa to Wd. In addition, the ECU 20 detects or determines that the occupant 30 is in a state of being seated at the seat 1 while being deviated in the direction in which the deviation of the load is generated. When the deviation is detected, in a case where it is determined that the stable state, in which the difference between the first change amount ΔRx and the second change amount ΔRxb falls within the predetermined range, is established, the ECU 20 estimates that the seating posture of the occupant 30 is inclined in the deviation direction of the load.

That is, the occupant 30 seated at the seat 1 can incline his or her posture without lifting or taking off the buttocks and/or thighs from the seating surface 2s of the seat 1. In this case, the change of the load ratio Rx which leads to the deviation detection is the stable change including a small fluctuation range of the inclination. Consequently, according to the above-described configuration, the type of the deviated seating state is accurately estimated as the inclination of the seating posture.

(2) When the deviation is detected, in a case where it is determined that the stable state in which the difference between the first change amount ΔRx and the second change amount ΔRxb is within the predetermined range is not established, the ECU 20 serving as a position displacement estimation portion estimates that the seating position of the occupant 30 is displaced in the deviation direction of the load.

That is, in many cases, the occupant 30 seated at the seat 1 changes or displaces the seating position while remaining seated at the seat 1 in a manner that the occupant 30 alternately lifts his or her right and left buttocks and thighs, which are placed on the seating surface 2s of the seat 1, thereby generating the fluctuations or changes of the load. These fluctuations of the load appear as the unstable change of the load ratio Rx, which leads to the deviation detection. Consequently, according to the above-described configuration, the displacement of the seating position relative to the seat 1 is detected in distinction from the inclination of the seating posture.

(3) The ECU 20 serving as a change amount calculation portion calculates the first change amount ΔRx of the load ratio Rx in every calculation cycle of the load ratio Rx. In a case where the difference between the first change amount ΔRx of the change ratio Rx and the second change amount ΔRxb of the load ratio Rx is smaller than the predetermined threshold value δ (|ΔRx−ΔRxb|<δ), the ECU 20 serving as the stability determination portion determines that the stable state in which the difference between the first change amount ΔRx and the second change amount ΔRxb is within the predetermined range is established. Further, the ECU 20 measures the number of consecutive times (the counter value N) at which it is determined that the stable state in which the difference between the first change amount ΔRx and the second change amount ΔRxb is within the predetermined range is established. When the deviation is detected, in a case where the counter value N is equal to or greater than the predetermined threshold value N0 (N≥N0), the ECU 20 determines that "the stable state, in which the difference between the first change amount ΔRx and the second change amount ΔRxb is within the predetermined range, is established". Accordingly, it is detected that the change or the fluctuation of the load ratio Rx which leads to the deviation detection was the stable change including the small fluctuation range of the inclination.

A second embodiment of the occupant detection apparatus implemented on the seat for the vehicle will be explained hereunder with reference to the drawings. For convenience of the explanation, the identical numerical designations are given to the structures and/or configurations including the identical functions to those of the first embodiment, and the explanation thereof will be omitted.

Figure 12A:
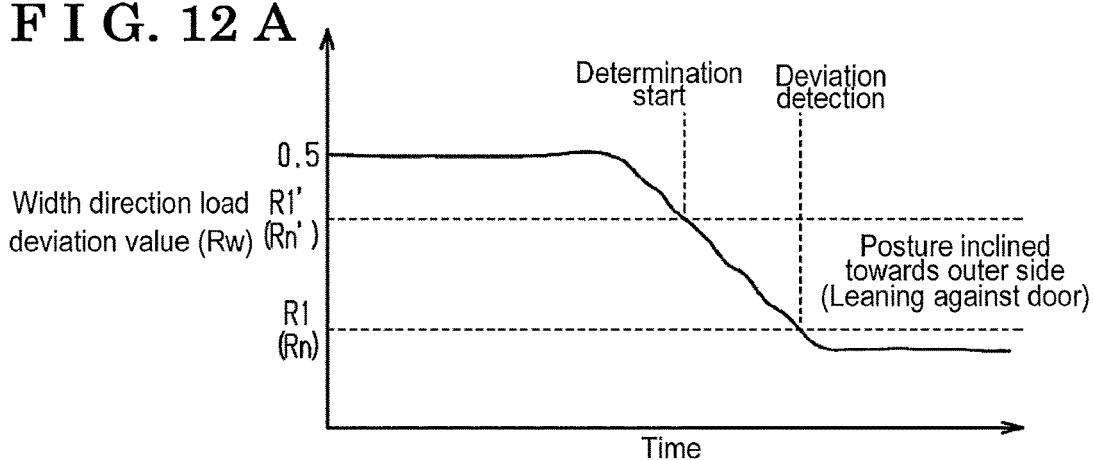
FIG. 12A is an explanation view showing a deviation determination and the determination of the type thereof according a second embodiment disclosed here.
Figure 12B:
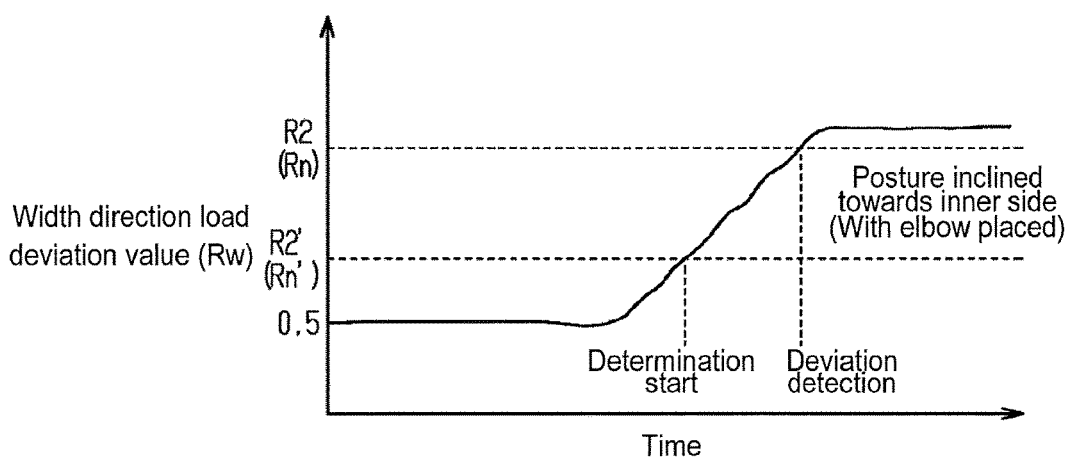
FIG. 12B is an explanation view showing the deviation determination and the determination of the type thereof according the second embodiment disclosed here.
Figure 12C:
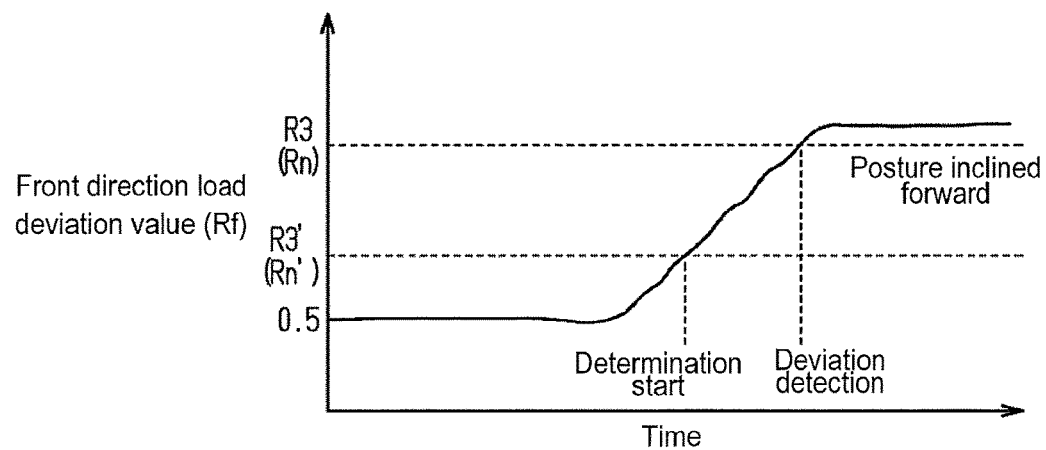
FIG. 12C is an explanation view showing the deviation determination and the determination of the type thereof according the second embodiment disclosed here

As shown in FIGS. 12A to 12C, the ECU 20 of the embodiment sets in advance a start threshold value Rn' (i.e., a predetermined threshold value) for the stability determination related to the changing state of the load ratio Rx (Rw, Rf). After the load ratio Rx of the seat 1 reaches the start threshold value Rn' of the load ratio change stability determination, the ECU 20 measures the number of times (a counter value Z) at which it is determined that "the difference between the first change amount ΔRx of the load ratio Rx and the second change amount ΔRxb of the load ratio Rx is in a state of being smaller than the predetermined threshold value δ" until the load ratio Rx of the seat 1 reaches a threshold value Rn of the deviation determination (refer to FIGS. 5 and 6). In a case where the counter value Z is equal to or greater than a predetermined threshold Z0 (Z≥Z0), the ECU 20 determines that "the stable state, in which the difference between the first change amount ΔRx and the second change amount ΔRxb is within the predetermined range, is established".

In detail, as the start threshold value Rn' (R1', R2', Re') of the load ratio change stability determination, a value of the load ratio Rx is set which may cause the estimation that the occupant 30 is in middle of the action of transitioning to the inclined posture. Specifically, at the estimation of the posture inclined towards the outer side, as shown in FIG. 12A, the start threshold value R1' of the load ratio change stability determination is set at a value greater than the predetermined threshold value R1 of the deviation determination (refer to FIG. 5, Step S302) (R1<R1'<0.5). In addition, at the estimation of a posture inclined towards the inner side, as shown in FIG. 12B, the start threshold value R2' of the load ratio change stability determination is set at a value smaller than the predetermined threshold value R2 of the deviation determination (refer to FIG. 5, Step S305) (R2>R2'>0.5). Further, at the estimation of a posture inclined forward, as shown in FIG. 12C, the start threshold value R3' of the load ratio change stability determination is set at a value smaller than the predetermined threshold value R3 of the deviation determination (refer to FIG. 6, Step S402) (R3>R3'>0.5). In a case where the load ratio Rx (Rw, Rf) of the seat 1 reaches the start threshold value Rn' (R1', R2', R3') (Rw≤R1', Rw≥R2', Rf≤R3'), the ECU 20 of the embodiment starts the load ratio change stability determination, and the ECU 20 performs the estimation of the inclination of the posture of the occupant 30 seated at the seat 1 on the basis of a determination result of the load ratio change stability determination.

Figure 13:
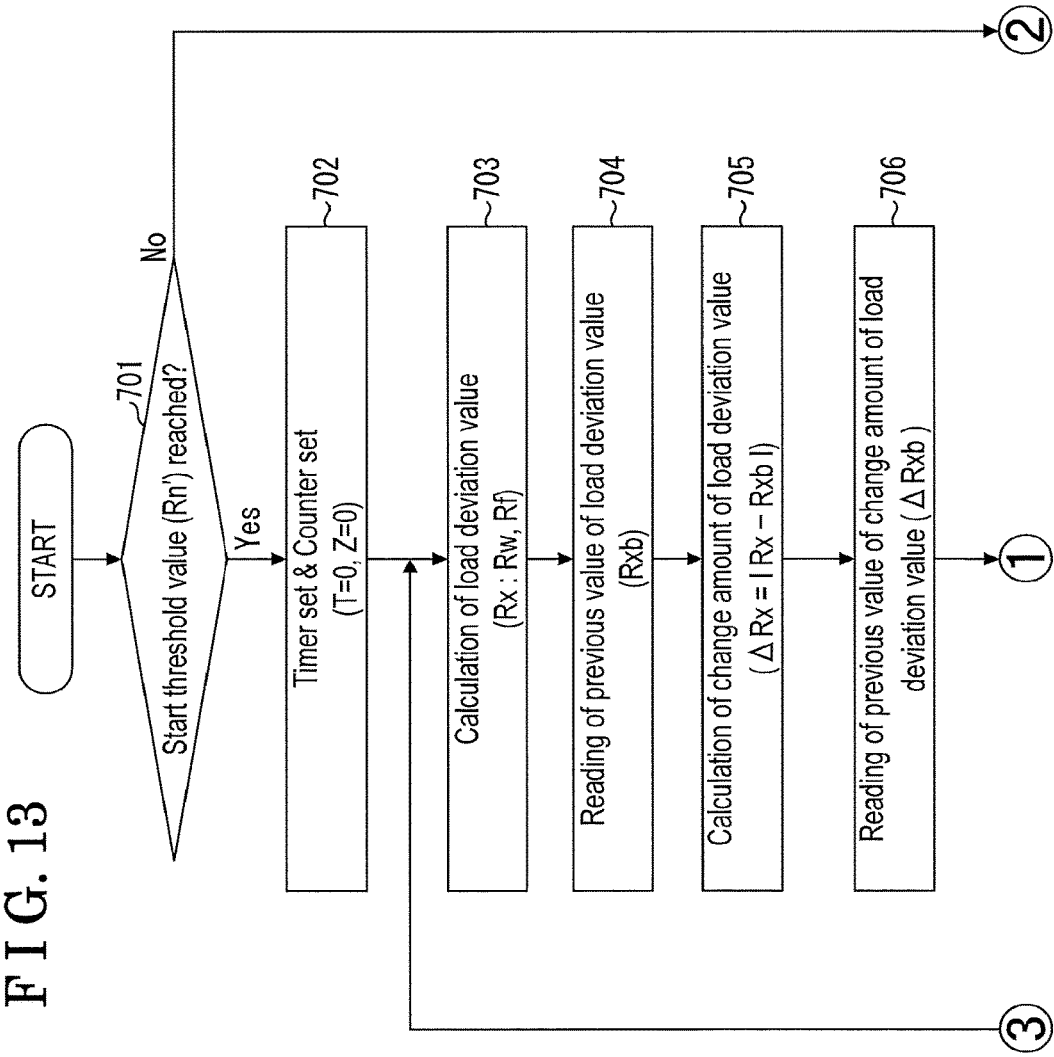
FIG. 13 is a flowchart showing procedure of the deviation determination and the determination of the type thereof according the second embodiment disclosed here.
Figure 14:
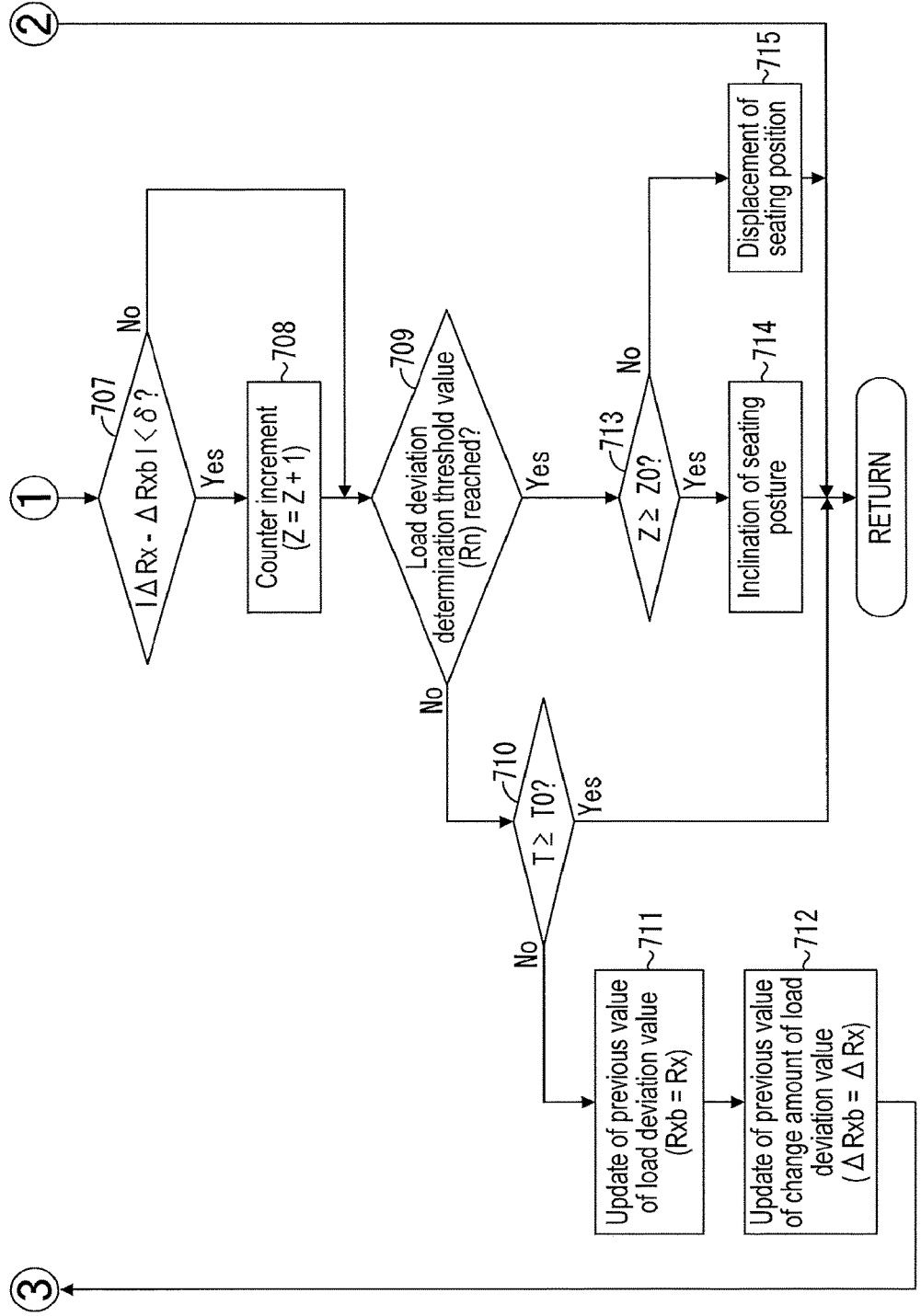
FIG. 14 is the flowchart showing procedure of the deviation determination and the determination of the type thereof according the second embodiment disclosed here

In detail, as shown in the flowchart of FIGS. 13 and 14, in a case where the ECU 20 of the embodiment determines that the load ratio Rx of the seat 1 has reached the start threshold value Rn' (R1', R2', R3') of the load ratio change stability determination (Step S701: YES), first, the ECU 20 sets a timer and a counter (T=0, Z=0, Step S702).

Next, in a similar manner to the load ratio change stability determination of the above-described embodiment (refer to FIG. 11), the ECU 20 calculates the load ratio Rx (Step S703), and reads out the previous value Rxb of the load ratio Rx (Step S704). In addition, the ECU 20 calculates the first change amount ΔRx of the load ratio Rx of the calculation cycle (ΔRx=|Rx−Rxb|, Step S705) and reads out the second change amount ΔRxb that is the previous amount of the first change amount ΔRx of the load ratio Rx calculated in the previous calculation cycle (Step S706). Then, the ECU 20 determines whether or not the difference between the first change amount ΔRx of the load ratio Rx and the second change amount ΔRxb of the load ratio Rx (|ΔRx−ΔRxb|), which indicates the fluctuation range of the inclination of the change of the load ratio Rx, is smaller than the predetermined threshold value δ (Step S707).

Next, in a case where the ECU 20 determines that the determination condition of Step S707 is satisfied (|ΔRx−ΔRxb|<δ, Step S707: YES), that is, in a case where the ECU 20 determines that "the stable state in which the difference between the first change amount ΔRx and the second change amount ΔRxb is within the predetermined range is established", the ECU 20 increments the counter set at Step S702 (Z=Z+1, Step S708). Then, in a case where the determination condition of Step S707 is not satisfied (|ΔRx−ΔRxb|≥δ, Step S707: NO), the ECU 20 does not perform the procedure of Step S708.

Next, the ECU 20 determines whether or not the load ratio Rx (Rw, Rf) of the seat 1 has reached the threshold value Rn (R1, R2, R3) of the deviation determination (Step S709). In a case where the load ratio Rx has not reached the threshold value Rn of the deviation determination (Step S709: NO), the ECU 20 determines whether or not a predetermined time period T0 has passed or elapsed since the load ratio Rx of the seat 1 reached the start threshold value Rn' of the load ratio change stability determination (Step 710). In a case where the predetermined time period T0 has not passed (Step S710: NO), the ECU 20 updates the previous value Rxb with the current value (Rxb=Rx, Step S711) with regard to the load ratio Rx, and updates the second change amount ΔRxb with the current value with regard to the first change amount ΔRx of the load ratio Rx (ΔRxb=ΔRx, Step S712). Then, the ECU 20 repeats the procedures of the Step S703 to Step S712 until it is determined at Step S709 that the load ratio Rx reached the threshold value Rn of the deviation determination (Step S709: YES) or it is determined at Step S710 that the predetermined time period T0 passed (Step S710: YES).

Next, in a case where it is determined at Step S709 that the load ratio Rx reached the threshold value Rn of the deviation determination (Step S709: YES), the ECU 20 determines whether or not the counter value Z set at Step S702 is equal to or greater than the predetermined threshold value Z0 (Step S713). In a case where the counter value Z is equal to or greater than the predetermined threshold value Z0 (Z≥Z0, Step S713: YES), the ECU 20 determines that "the stable state, in which the difference between the first change amount ΔRx and the second change amount ΔRxb is within the predetermined range, is established" and estimates that the posture of the occupant 30 is inclined in the deviation direction of the load (the inclination of the seating posture, Step S714).

In a case where the counter value Z is less the predetermined threshold value Z0 at Step S713 (Z<Z0, Step S713: NO), the ECU 20 determines that "the stable state in which the difference between the first change amount ΔRx and the second change amount ΔRxb is in the predetermined range was not established". Then, the ECU 20 estimates that the seating position of the occupant 30 is displaced towards the width direction outer side (the displacement of the seating position, Step S715).

That is, with regard to the determination of "whether or not the stable state, in which the difference between the first change amount ΔRx and the second change amount ΔRxb is within the predetermined range, is established", the ECU 20 of the embodiment does not necessary give importance on consecutiveness or continuity thereof. That is, the counter value Z of the embodiment indicates the number of times at which it is determined that the difference between the first change amount ΔRx of the load ratio Rx and the second change amount ΔRxb of the load ratio Rx (|ΔRx−ΔRxb|) is in a state of being smaller than the predetermined threshold value δ, by the time when the load ratio Rx reaches the threshold value Rn of the deviation determination. The difference indicates "the fluctuation or change range of the inclination", and the predetermined threshold value δ defines "the predetermined range". In a case where "the number of times at which it is determined that the stable state in which the difference between the first change amount ΔRx and the second change amount ΔRxb is within the predetermined range is established" is large, the ECU 20 of the embodiment determines that the change of the load ratio which leads to the deviation detection was the stable change with the small fluctuation range of the inclination.

That is, the ECU 20 of the embodiment allows or tolerate that the stable state is intermittent. Accordingly, even in circumstances in which the estimation is easily subject to disturbance, the type of the deviation can be estimated as the inclination of the seating posture.

In a case where it is determined at Step 710 that the predetermined time period T0 has passed since the load ratio Rx of the seat 1 reached the start threshold value Rn' of the load ratio change stability determination (T≥T0, Step S710: YES), the ECU 20 of the embodiment does not perform the procedures of Step S713 to Step S715 (being over the time limit or the time limit has been reached). That is, a time period that the occupant 30 takes to transition to the inclined posture does not exceed a substantially certain time period (the predetermined time period T0) even in view of individual difference. Consequently, the ECU 20 of the embodiment detects the deviation and estimates the type of the deviation with accuracy.

The aforementioned embodiments may be changed or modified as follows. The load deviation value may be changed to an appropriate value as long as the value indicates the deviation. In each of the aforementioned embodiments, the load sensors 11 (11a to 11d) are provided below the seat 1, at the positions corresponding to the four corner portions of the seat cushion 2 of the seat 1. However, the number and the arrangement of the load sensors 11, which are used for the detection of the load applied to the seat and for the detection of the deviation thereof, are not limited thereto, and may be arbitrarily changed. The number of the detection sensors 11 may be two, three, five or more than five. For example, according to a configuration including two of the load sensors 11 that are arranged to be apart from each other in the front and rear direction of the seat 1, the deviation of the load in the front and rear direction can be detected. According to a configuration including two of the load sensors 11 that are arranged to be apart from each other in the vehicle width direction, the deviation of the load in the vehicle width direction (that is, at the inner side and the outer side) can be detected.

Figure 15:
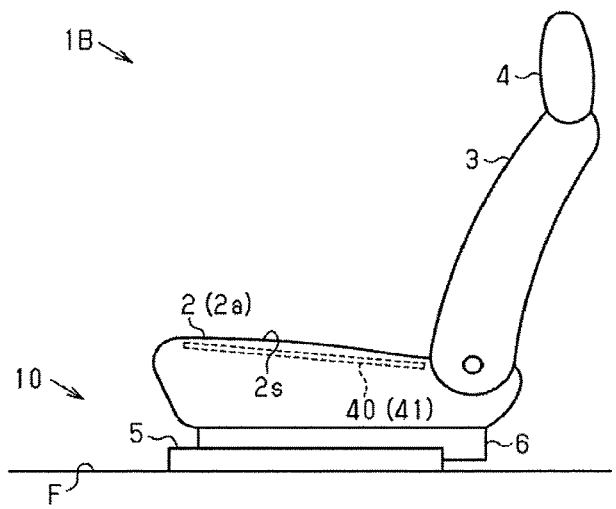
FIG. 15 is a side view of the seat for the vehicle which is provided with a pressure sensor according to the embodiments.

As shown in FIG. 15, a seating sensor 40 forming a pressure-sensitive portion at the seating surface 2s of the seat cushion 2 may be included in the configuration. Specifically, at a seat 1B illustrated in FIG. 15 as an example, a pressure sensor 41 including plural pressure-sensitive points and formed in a sheet shape is used for the seating sensor 40. The pressure sensor 41 is arranged at a bottom side or a reverse side of a seat facing 2a, and accordingly the pressure-sensitive points are formed over the entire region of the seating surface 2s.

That is, a pressure distribution at the seating surface 2s is detected with the use of the seating sensor 40. Then, the deviation of the load may be configured to be detected on the basis of the pressure distribution. By applying the above-described configuration, the number of the load sensors 11 can be reduced to one. In this case, the load sensor 11 may be arranged at a position corresponding to a center or an approximate center of the seating surface 2s. In addition, the seating sensor 40 may be configured to detect the seating of the occupant 30 onto the seat 1B, that is, detect whether or not the occupant 30 is seated at the seat 1B. In a case where the pressure sensor 41 forming the seating sensor 40 is capable of detecting a value of load, that is, in a case where the pressure sensor 41 includes a function as the load sensor, the strain gauge can be omitted from the configuration, the strain gauge which is interposed between the seat 1 and the support member of the seat 1, such as the load sensors 11 of the aforementioned embodiments.

In the aforementioned embodiments, the deviation determination is performed with regard to the three directions including the vehicle width direction both sides and the front side of the seat 1, on the basis of the load ratio Rx (Rw, Rf) of the seat 1. Further, with regard to the three directions, it is estimated whether or not the seating posture of the occupant 30 is inclined or tilted in the deviation direction of the load. However, the directions in which the estimation of the inclination of the seating posture is performed are not limited thereto, and may be arbitrarily set. For example, it may be configured such that the seating posture of the occupant 30 is estimated as the posture inclined towards the outer side (so-called the seating posture while leaning against the door) in which the occupant 30 is leaning against, for example, a side door forming a wall portion of a vehicle cabin only in a case where the load is deviated towards the vehicle width direction outer side. It may be configured such that the seating posture of the occupant 30 is estimated as the posture inclined forward only in a case where the load is deviated forward. It may be configured such that the seating posture of the occupant 30 is estimated as the posture inclined towards the inner side (so-called a posture with an elbow placed) in which the occupant 30 places his or her elbow on, for example, a console only in a case where the load is deviated towards the vehicle width direction inner side. It may be configured such that the inclination estimation of the seating posture of the occupant 30 is performed with regard to any two directions out of the above-described three directions.

In the aforementioned embodiments, the first change amount ΔRx of the load ratio Rx is calculated in each calculation cycle of the load ratio Rx. Then, in a case where the difference between the first change amount ΔRx and the second change amount ΔRxb is smaller than the predetermined threshold value δ (|ΔRx−ΔRxb|<δ), it is determined that the stable state in which the difference between the first change amount ΔRx and the second change amount ΔRxb is within the predetermined range is established. However, the disclosure is not limited thereto. The determination of whether or not the stable state is established does not need to be performed in each calculation cycle of the load ratio Rx, and may be performed in a predetermined cycle that is longer than the calculation cycle of the load ratio Rx, for example.

In the first embodiment, in a case where the counter value N is equal to or greater than the threshold value N0 (refer to FIG. 11, N≥N0, Step S610: YES), it is determined that the stable state, in which the difference between the first change amount ΔRx and the second change amount ΔRxb is within the predetermined range, is established. Here, the counter value N indicates the number of consecutive times at which it is determined that the difference between the first change amount ΔRx and the second change amount ΔRxb is smaller than the predetermined threshold value δ. Then, when the deviation is detected (refer to FIG. 8, Step S501: YES), in a case where the stability of the change is shown in the on-going stability determination (refer to FIG. 11, Step S611), it is determined that "the stable state in which the difference between the first change amount ΔRx and the second change amount ΔRxb is within the predetermined range is established".

However, the disclosure is not limited thereto. For example, in a case where the deviation is detected and the counter value N indicating the above-described number of consecutive times is less than the predetermined threshold value N0 in the on-going stability determination (refer to FIG. 11, N<N0, Step S610, NO), the measurement record of the stability determination up to the previous time, the measurement record which is stored (registered) in the memory area 20a of the ECU 20 (FIG. 11, Step S614) may be referred to. On the basis of the past measurement record stored in the memory area 20a, it may be determined whether "the stable state in which the difference between the first change amount ΔRx and the second change amount ΔRxb is within the predetermined range is established" or not.

For example, the time period for the occupant 30 to take to transition to the inclined posture is within the substantially certain time period (a predetermined time period Tb) even if the individual difference is taken into consideration. In light of this aspect, it may be configured as follows. In a case where the deviation is detected or determined on the basis of the load ratio Rx of the seat 1, the determination is retrospectively made on the predetermined time period Tb in a past on whether or not "the stable state in which the difference between the first change amount ΔRx and the second change amount ΔRxb was within the predetermined range" was established. The predetermined time period Tb corresponds to a past time period going back to the past from a time point at which the deviation is detected. Also in a case where such a stable state was established, it is determined that "the stable state in which the difference between the first change amount ΔRx and the second change amount ΔRxb is within the predetermined range is established", and accordingly it is estimated that the posture of the occupant 30 seated at the seat 1 is inclined in the direction of the deviation of the load.

Figure 16:
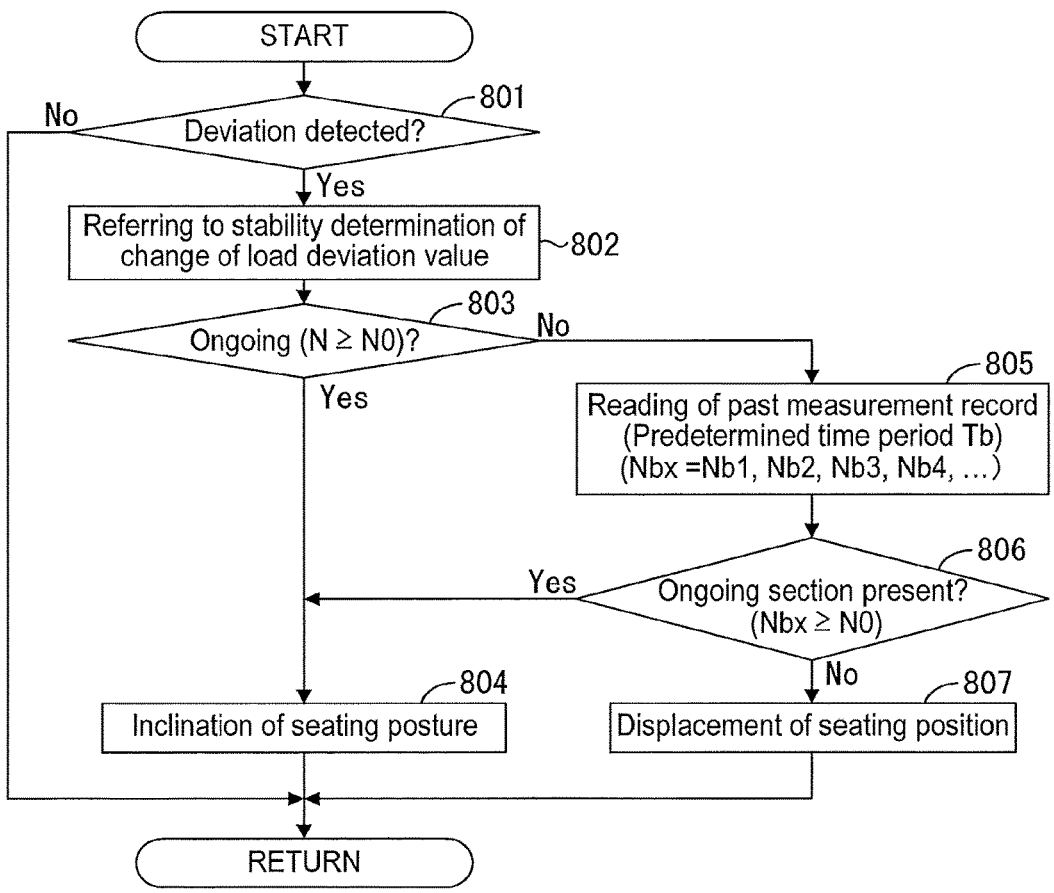
FIG. 16 is a flowchart showing procedure of another example related to the determination of the type of the deviated seating state.

Specifically, as shown in the flowchart of FIG. 16, in a case where the deviation is detected on the basis of the load ratio Rx of the seat 1 (Step S801: YES), the ECU 20 refers to the stability determination (Step S802) related to the changing state of the load ratio Rx (refer to FIG. 11, Step S611) in a similar manner to the aforementioned embodiments. In a case where it is determined at this time point that the stable state in which the difference between the first change amount ΔRx and the second change amount ΔRxb is within the predetermined range is established" (refer to FIG. 11, the number of consecutive times: N≥N0) (Step S803: YES), it is estimated that the seating posture of the occupant 30 is inclined (Step S804).

On the other hand, in a case where it is determined that "the stable state in which the difference between the first change amount ΔRx and the second change amount ΔRxb is within the predetermined range was not established (refer to FIG. 11, the number of consecutive times: N<N0)" at the time point when the deviation is detected on the basis of the load ratio Rx of the seat 1 (Step S803: NO), the ECU 20 reads out past measurement record Nbx of the predetermined time period Tb towards the past time from the time point at which the deviation is detected (Step S805). In FIG. 16, "Nb1, Nb2, Nb3 . . . " correspond to the counter values N indicating the number of the consecutive times registered in the memory area 20a as the previous measurement record, the measurement record two times before, and the measurement record three times before, respectively. Next, the ECU 20 determines whether or not each of the past measurement records Nbx is equal to or greater than the predetermined threshold N0 (Step S806). Also in a case where any of the past measurement records Nbx is equal to or greater than the threshold value N0 (N≥N0, Step S806: YES), that is, in a case where it is determined that "the stable state in which the difference between the first change amount ΔRx and the second change amount ΔRxb is within the predetermined range" was established related to the change of the load ratio Rx, it is estimated that the seating posture of the occupant 30 is inclined (Step S804).

By applying the above-described configuration, even though the change of the load ratio Rx is temporarily in the unstable state when the deviation is detected, the change of the load ratio Rx leading to the deviation detection can be considered as the stable change including the small fluctuation width of the inclination if the change of the load ratio Rx was stable with the small fluctuation range before the unstable state. On the basis of the determination result, the type of the deviation is estimated as the inclination of the seating posture.

Figure 17:
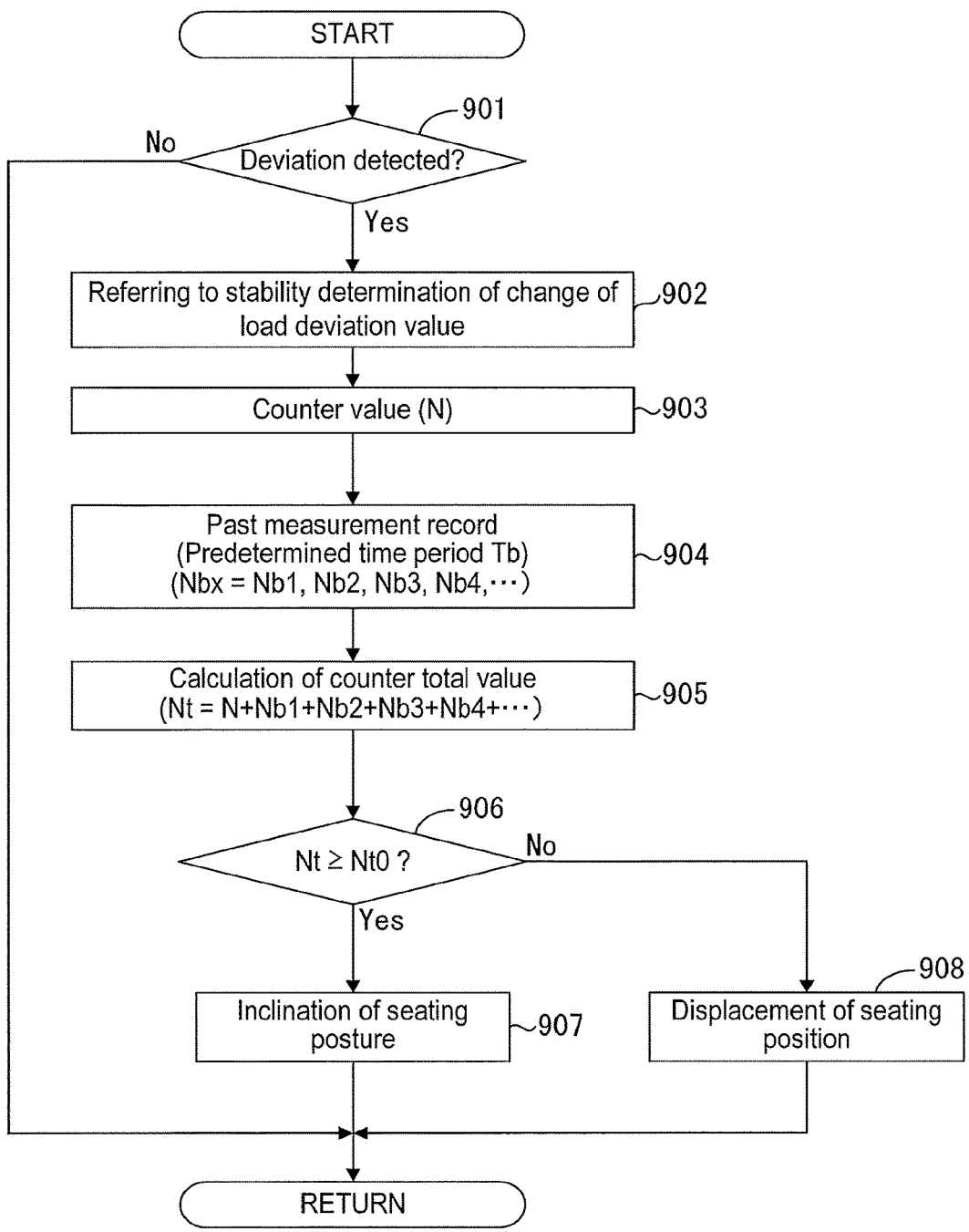
FIG. 17 is a flowchart showing procedure of still another example related to the determination of the type of the deviated seating state.

Further, as shown in the flowchart of FIG. 17, in a case where the deviation is detected on the basis of the load ratio Rx of the seat 1 (Step S901), first, the ECU 20 refers to the stability determination that is ongoing (refer to FIG. 11) (Step S902), and obtains the counter value N (Step S903). Next, the ECU 20 reads out the past measurement records Nbx of the predetermined time period Tb in the past, back from the time point at which the deviation is detected (Step S904). Further, the ECU 20 calculates a total value (a total counter value Nt) of the counter values indicated by the past measurement records Nbx and the current counter value N (Nt=N+Nb1+Nb2+Nb3+ . . . , Step S905). In a case where the total counter value Nt is equal to or greater than a predetermined threshold Nt0 (Step S906: YES), it is estimated that the posture of the occupant 30 seated at the seat 1 is inclined in the deviation direction of the load (Step S907).

That is, for the predetermined time period Tb in the past back from the time point at which the deviation is detected on the basis of the load ratio Rx of the seat 1, the ECU 20 retrospectively calculates the sum of times it was determined that "the difference between the first change amount ΔRx of the load ratio Rx and the second change amount ΔRxb of the load ratio Rx was in a state of being smaller than the predetermined threshold value δ" in a retroactive manner. In a case where the total counter value Nt indicating the sum of times is equal to or greater than the predetermined threshold value Nt0 (Step S906: YES), it is determined that "the stable state in which the difference between the first change amount ΔRx and the second change amount ΔRxb is within the predetermined range was established". By applying the above-described configuration, similarly to the second embodiment, even in the circumstances in which the estimation is easily subject to the disturbance, the type of the deviation can be estimated as the inclination of the seating posture.

Next, technical ideas which can be grasped from the aforementioned embodiments will be described. (A) The load is detected by the load sensor interposed between the seat and the support member of the seat.

(B) The load is detected by the load sensor provided at the bottom side or the reverse side of the seat facing forming the seating surface of the seat. (C) The occupant detection method includes, when the deviation is detected, retrospectively calculating the total value of the number of times at which it was determined that the stable state in which the difference between the first change amount and the second change amount is within the predetermined range was established, the calculation is retrospectively performed on, that is, targeted at, the predetermined time period back towards the past, and determining that the stable state in which the difference between the first change amount and the second change amount is within the predetermined range is established in a case where the total value exceeds the predetermined threshold value.

According to the aforementioned embodiments, the occupant detection method includes t detecting the load applied to the seat 1 for the vehicle, determining whether or not the occupant 30 is seated at the seat 1, calculating the load ratio Rx (i.e., the load deviation value) indicating the deviation of the load at the seat 1, determining whether or not the deviation exists at the seat 1 on the basis of the load ratio Rx, and estimating that the seating posture of the occupant 30 at the seat 1 is inclined in the direction in which the load is deviated in a case where it is determined that the deviation exists and that the stable state is established, the stable state corresponding to the state in which the difference between the first change amount $\Delta Rx$ indicating the change amount of the load ratio Rx in the first cycle and the second change amount $\Delta Rxb$ indicating the change amount of the load ratio Rx in the second cycle is within the predetermined range.

The occupant 30 seated at the seat 1 can incline his or her posture without lifting up his or her buttocks and/or thighs off the seating surface of the seat 1. In this case, the change of the load ratio Rx which leads to the deviation detection is the stable change including the small fluctuation width of the inclination. Consequently, according to the above-described configuration, it is determined accurately that the type of the deviation in the seating state is the inclination of the seating posture.

According to the above-described configuration, the seating of the occupant 30 is detected in detail.

According to the aforementioned embodiments, the occupant detection method includes estimating that the seating position of the occupant 30 at the seat 1 is displaced in in the direction in which the load is deviated in a case where it is determined that the stable state is not established.

In many cases, the occupant 30 seated at the seat 1 changes the seating position while remaining seated at the seat 1, in a manner that the occupant 30 alternately lifts up his or her right and left buttocks and thighs, which are placed on the seating surface 2s of the seat 1, and accordingly the fluctuations or changes of the load is generated. These fluctuations appear as the unstable change of the load ratio Rx, which leads to the deviation detection. Consequently, according to the above-described configuration, the displacement of the seating position relative to the seat 1 is detected in distinction from the inclination of the seating posture.

According to the aforementioned embodiments, the occupant detection method includes calculating the first change amount $\Delta Rx$ and the second change amount $\Delta Rxb$ in the first cycle and the second cycle, respectively, each of the first cycle and the second cycle corresponding to each calculation cycle of the load ratio Rx, and determining that stable state is established in a case where the difference between the first change amount $\Delta Rx$ and the second change amount $\Delta Rxb$ is smaller than the predetermined threshold value $\delta$.

According to the above-described configuration, it is detected accurately that the change of the load ratio Rx is the stable change including the small fluctuation range of the inclination.

According to the above-described embodiment, the occupant detection method includes calculating the first change amount $\Delta Rx$ and the second change amount $\Delta Rxb$ in the first cycle and the second cycle, respectively, each of the first cycle and the second cycle corresponding to the predetermined calculation cycle of the load ratio Rx, and determining that stable state is established in a case where the difference between the first change amount $\Delta Rx$ and the second change amount $\Delta Rxb$ is smaller than the predetermined threshold value $\delta$.

According to the aforementioned embodiment, the occupant detection method includes measuring the counter value N (i.e., the number of consecutive times) at which the determination is made that the stable state is established, and determining that the stable state is established in a case where the counter value N is equal to or greater than the predetermined threshold value N0.

According to the above-described configuration, the change of the load ratio Rx on the way to the deviation detection was the stable change including the small fluctuation range of the inclination. On the basis of the determination result, the type of the deviated seating state is estimated as the inclination of the seating posture accurately.

According to the aforementioned embodiment, the occupant detection method includes determining that the stable state is established, in a case where it is determined that the deviation exists and that the counter value N was equal to or greater than the predetermined threshold value N0 in the predetermined time period Tb back towards the past from the time point at which it is determined that the deviation exists.

The time period for the occupant 30 to take to transition to the inclined posture is within the substantially certain time period even in view of the individual difference. According to the above-described configuration, even though the change of the load ratio Rx was temporarily in the unstable state when the deviation was detected, the change of the load ratio Rx on the way to the deviation detection can be considered as the stable change including the small fluctuation width of the inclination in a case where the change of the load ratio Rx was stable with the small fluctuation range before the unstable state. Then, on the basis of the determination result, it is estimated that the type of the deviation is the inclination of the seating posture.

According to the aforementioned embodiment, the occupant detection method includes starting the measurement of the counter value Z (i.e., the number of times) at which it is determined that the stable state is established, in a case where the load ratio Rx reaches the start threshold value Rn' (i.e., the predetermined threshold value), and determining the stable state is established in a case where the counter value Z is equal to or greater than the predetermined threshold value Z0.

According to the above-described configuration, in a case where "the number of times at which it is determined that the stable state, where the difference between the first change amount $\Delta Rx$ and the second change amount $\Delta Rxb$ is within the predetermined range, is established" is large, it is determined that the change of the load ratio Rx which leads to the deviation detection was the stable change with the small fluctuation range of the inclination. That is, it is allowed that the stable state is intermittent. Consequently, even in the circumstances in which the estimation is easily subject to the disturbance, the type of the deviation can be estimated as the inclination of the seating posture According to the aforementioned embodiment, the occupant detection method includes, when it is determined that the deviation exists, calculating the total value of the number of times (i.e., the total counter value Nt) at which it was determined that the stable state was established, the total value Nt being retrospectively calculated for the predetermined time period Tb back towards the past from the time point at which it is determined that the deviation exists, and of determining that the stable state is established in a case where the total value Nt exceeds the predetermined threshold value Nt0.

According to the aforementioned embodiment, the occupant detection apparatus includes the load detection portion 901 detecting the load applied to the seat 1 for the vehicle, the seating determination portion 902 determining whether or not the occupant 30 is seated at the seat 1, a first calculation portion 904 calculating the load ratio Rx (i.e., the load ratio) indicating the deviation of the load at the seat 1, the deviation determination portion 903 determining whether or not the deviation exists at the seat 1 on the basis of the load ratio Rx, and the first estimation portion 905 estimating that the seating posture of the occupant 30 at the seat 1 is inclined in the direction in which the load is deviated in a case where it is determined that the deviation exists and that the stable state is established, the difference between the first change amount ΔRx indicating the change amount of the load ratio Rx in the first cycle and the second change amount ΔRxb indicating the change amount of the load ratio Rx in the second cycle being within the predetermined range in the stable state.

According to the aforementioned embodiment, the occupant detection apparatus includes the second estimation portion 906 estimating that the seating position of the occupant 30 at the seat 1 is displaced in in the direction in which the load is deviated in a case where it is determined that the stable state is not established.

According to the aforementioned embodiment, the occupant detection apparatus includes the second calculation portion 907 calculating the first change amount ΔRx and the second change amount ΔRxb in the first cycle and the second cycle, respectively, each of the first cycle and the second cycle corresponding to each calculation cycle of the load ratio Rx, and the stability determination portion 908 determining that stable state is established in a case where the difference between the first change amount ΔRx and the second change amount ΔRxb is smaller than the predetermined threshold value δ.

According to the aforementioned embodiments, the load ratio Rx is detected by the load sensor 11 arranged between the seat 1 and the support member 6 of the seat 1.

According to the aforementioned embodiments, the load ratio Rx is detected by the load sensor 11 provided at the reverse side of the seat facing 2a forming the seating surface 2s of the seat 1.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An occupant detection method comprising:
   detecting a load applied to a seat for a vehicle;
   determining whether or not an occupant is seated at the seat;
   calculating a load deviation value indicating deviation of the load at the seat;
   determining whether or not the deviation exists at the seat on the basis of the load deviation value; and
   estimating that a seating posture of the occupant at the seat is inclined in a direction in which the load is deviated in a case where it is determined that the deviation exists and that a stable state is established, the stable state corresponding to a state in which a difference between a first change amount indicating a change amount of the load deviation value in a first cycle and a second change amount indicating a change amount of the load deviation value in a second cycle is within a predetermined range.

2. The occupant detection method according to claim 1, comprising:
   estimating that a seating position of the occupant at the seat is displaced in the direction in which the load is deviated in a case where it is determined that the stable state is not established.

3. The occupant detection method according to claim 1, comprising:
   calculating the first change amount and the second change amount in the first cycle and the second cycle, respectively, each of the first cycle and the second cycle corresponding to each calculation cycle of the load deviation value, and
   determining that stable state is established in a case where the difference between the first change amount and the second change amount is smaller than a predetermined threshold value.

4. The occupant detection method according to claim 1, comprising:
   calculating the first change amount and the second change amount in the first cycle and the second cycle, respectively, each of the first cycle and the second cycle corresponding to a predetermined calculation cycle of the load deviation value, and
   determining that stable state is established in a case where the difference between the first change amount and the second change amount is smaller than a predetermined threshold value.

5. The occupant detection method according to claim 1, comprising:
   measuring number of consecutive times at which the determination is made that the stable state is established; and
   determining that the stable state is established in a case where the number of consecutive times is equal to or greater than a predetermined threshold value.

6. The occupant detection method according to claim 5, comprising:
   determining that the stable state is established, in a case where it is determined that the deviation exists and that the number of consecutive times was equal to or greater than the predetermined threshold value in a predetermined time period towards past from a time point at which it is determined that the deviation exists.

7. The occupant detection method according to claim 1, comprising:
   starting measurement of number of times at which it is determined that the stable state is established, in a case where the load deviation value reaches a predetermined threshold value; and
   determining the stable state is established in a case where the number of times is equal to or greater than a predetermined threshold value.

8. The occupant detection method according to claim 1, comprising:
   when it is determined that the deviation exists, calculating a total value of number of times at which it was determined that the stable state was established, the total value being retrospectively calculated for a predetermined time period towards past from a time point at which it is determined that the deviation exists; and
   determining that the stable state is established in a case where the total value exceeds a predetermined threshold value.

9. An occupant detection apparatus comprising:
   a load detection portion detecting a load applied to a seat for a vehicle;
   a seating determination portion determining whether or not an occupant is seated at the seat;
   a first calculation portion calculating a load deviation value indicating deviation of the load at the seat;
   a deviation determination portion determining whether or not the deviation exists at the seat on the basis of the load deviation value; and
   a first estimation portion estimating that a seating posture of the occupant at the seat is inclined in a direction in which the load is deviated in a case where it is determined that the deviation exists and that a stable state is established, a difference between a first change amount indicating a change amount of the load deviation value in a first cycle and a second change amount indicating a change amount of the load deviation value in a second cycle being within a predetermined range in the stable state.

10. The occupant detection apparatus according to claim 9, comprising:
    a second estimation portion estimating that a seating position of the occupant at the seat is displaced in in a direction in which the load is deviated in a case where it is determined that the stable state is not established.

11. The occupant detection apparatus according to claim 9, comprising:
    a second calculation portion calculating the first change amount and the second change amount in the first cycle and the second cycle, respectively, each of the first cycle and the second cycle corresponding to each calculation cycle of the load deviation value, and
    a stability determination portion determining that stable state is established in a case where the difference between the first change amount and the second change amount is smaller than a predetermined threshold value.

12. The occupant detection apparatus according to claim 9, wherein the load deviation value is detected by a load sensor arranged between the seat and a support member of the seat.

13. The occupant detection apparatus according to claim 9, wherein the load deviation value is detected by a load sensor provided at a reverse side of a seat facing forming a seating surface of the seat.

* * * * *